United States Patent Office

2,698,307
Patented Dec. 28, 1954

2,698,307

ADHESIVE OR MOLDING COMPOSITION COMPRISING BROWN ROTTED WOOD AND PHENOL-FORMALDEHYE RESIN

Clark C. Heritage, Minneapolis, Minn., assignor to Weyerhaeuser Timber Company, Longview, Wash., a corporation of Washington No Drawing. Application November 18, 1949, Serial No. 128,239

3 Claims. (Cl. 260—17.2)

This invention is predicated upon the discovery that decayed wood may be obtained as a new starting material for commercial use by isolating the decay itself through a physical processing based upon comminution and fractionation without damage to the reactivity of the lignin content of the decay, as compared with lignins modified and rendered less useful by chemical process separation. The invention relates to the utilization of decayed wood in the manufacture of products such as, for example, hardboard, molding compounds and adhesives, and to the processes employed in making such products.

Decay of wood is commonly associated with the disintegration of fallen trees, stumps, branches and roots, and particularly with reference to dead wood. However, it is recognized by those experienced in forestry that a stupendous economic waste and an irreparable destruction of our national resources results from the ravages of decay producing fungi on the sound wood of living standing trees.

The decay-causing fungi invade the living trees following the inroads made by insects or larvae, and in the wounds or exposed areas of living tissue caused by stubs of fallen branches, broken limbs, fire wounds, rubbed surfaces, etc. Except for certain outward evidences such as "conks" and swollen knots on the tree, the decay, and particularly its extent, is not readily detected until after logging or even saw milling operations are under way. The loss is of a two-fold nature—first, the loss of the sound timber itself, and secondly, the loss of labor expended in processing logs which finally develop to be cull or defective and are rejected as worthless except for fuel and other low value uses.

It is, accordingly, the primary object of this invention to teach the conversion into useful products of the otherwise waste decayed wood, either as it is obtained from fallen trees, stumps, etc., as it thus occurs in the forest, or as it is obtained from defective logs, which are rejected for lumber purposes.

The instant invention has for a further object the provision of a new binding material for hot pressed boards and fiber structures; the provision of a new heat reactive material for use in the manufacture of hardboards, molding compounds, adhesives and the like, and composed principally of lignin free of polysaccharides including cellulose; the provision of a moldable material derived from wood products containing lignin free of saccharides including cellulose; the provision of a moldable material comprising in major proportion a heat reactive constituent derived from decayed wood; the provision of a new method of treatment of material derived from decayed wood whereby it may be segregated according to the degree of progression of decay and its lignin content; the provision of a new method of treatment of decayed wood whereby it is converted into a shaped product having new and useful properties; and the provision of a structural hot pressed board comprising wood fiber and a binder derived from wood decay.

The decay of wood is caused by the growth of fungus organisms on the wood tissue as the host. The fungus consists of very fine, threadlike structures, the single threads of which, called hyphae, are microscopic and invisible to the unaided eye. Collectively, the hyphae are termed mycelium. The general nature of attack on wood is a chemical enzymatic action on the cell walls. The hyphae live in the tissues of the substance on which the fungus is growing and extend their growth in wood by boring through the cell walls.

The early stages of decay show the mycelium of the fungus invading new tissue. Hyphae grow in all directions. The infected wood sometimes exhibits color changes and may be softened, embrittled, or otherwise degraded. Discolorations and zone lines may be formed. In the advanced stages the decay is plainly a factor in breaking down the wood cells. Changes in strength, color, texture and continuity are apparent.

The wood destroying fungi which attack the heartwood of living or dead trees may roughly be divided into two groups, depending on the habits of growth of the hyphae. In one group are those fungi whose hyphae penetrate the cell walls but dissolve only the lignin, thereby producing cavities in otherwise sound wood. These generally are known as "white rot" and are herein referred to as "lignin destroying." In the other group belong those fungi whose hyphae attack the actual wood substance of the cell walls and destroy it, leaving the lignin as a brown crumbly mass. These generally are known as brown or cubical rots, and are herein referred to as "cellulose destroying." It is this latter group which provides the raw material with which this invention is concerned. The resulting decay material may be referred to and identified as "brown rotted wood," with the understanding that such term is descriptive of the type of decay produced by cellulose-destroying fungi, sometimes referred to generically as "brown rot" family of fungi.

There follows a description of some of the more common fungi which produce cubical decay, which is that form of decay which is a residual woody material which, for any given species, exceeds in caustic solubility and native lignin content the values of the sound wood from which it is derived.

*Brown trunk rot (also called red brown heartwood rot, dry rot, brown cubical rot, and laricis rot)—Fungus:* Fomes laricis (*quinine fungus*)

This is a cellulose destroying type of fungus and is estimated to be responsible for approximately 9% of the total loss of Douglas fir wood due to decay. It is a heart rot common to the main trunk of the tree, but is not confined to any particular portion of the bole. It forms a decay column of roughly conical shape, considering the area of greatest decay as the cone base, and is uniformly circular in cross sectional area of the log.

This decay is very difficult to detect in the incipient stage, as its color blends with the natural color of the heartwood. As the color becomes more pronounced the wood becomes softer. In the advanced stage the wood is a brown mass, easily crumbled between the fingers, and is more or less separated into irregular shaped cubes by cracks in shrinking. These cracks may be occupied by the conspicuous white mycelium felts. The wood is weakened in the incipient stage, and is devoid of strength in the advanced stage.

*Red brown butt rot (commonly known as butt rot)—Fungus:* Polyporus schweinitzii (*velvet top fungus*)

This is a cellulose destroying type of fungus and is estimated to be responsible for approximately 6% of the loss of Douglas fir wood due to decay. Ordinarily the decay is confined to the roots and butt section of the tree. The incipient stage is first evident as a faint yellowing or browning of the normal wood. This color intensifies and the wood becomes soft. In the advanced stage the wood is red brown in color and crushes to a red powder between the fingers. In the shrinkage cracks, thin, crust-like layers of mycelium are formed which may easily be mistaken for resin deposits. The wood is weakened in the incipient stage and is devoid of strength in the advanced stage.

*Yellow brown top rot—Fungus:* Fomes roseus

This is a cellulose destroying type of fungus, and is estimated to be responsible for approximately 4% of the loss of Douglas fir wood due to decay. It normally occurs in the upper part of the trunk or in the top of the tree beyond that portion of the bole ordinarily used for merchantable lumber. The decay column is roughly cylindrical following the shape of the heartwood, and tapers cone-like at the end. The first indication of this decay is a faint brownish or yellowish brown color, the outer limits of which are sometimes marked by a zone of greenish brown discoloration. In the advanced stage the decay is a yellow-brown crumbly rot with mycelium felts much less conspicuous than those of the brown trunk rot. The wood is weakened in the incipient stage and is devoid of strength in the advanced stage.

*Pecky heartwood rot—Fungus*: Polyporus amorus

This is a cellulose destroying type of fungus which particularly affects Western red cedar and incense cedar. It occurs most commonly in the middle portion of the trunk of the tree. The decay manifests itself by long lens shaped pockets formed parallel with the grain of the wood and filled with a brittle, brown, charcoal-like mass of decayed wood. Hoof or bell shaped conks appear at the knot holes of affected trees.

There are many other kinds of decay with their corresponding causal fungi to which Douglas fir and Western red cedar are susceptible, but those above mentioned are generally classified and dealt with as brown cubical rot.

In accordance with the present invention, decay material is obtained by any suitable method. The processing of the decayed wood is oriented with respect to the cellulose destroying brown or cubical decay, as it has been found that this decay is most useful as a raw material for plastics or binding materials. When the decay material is obtained from rotted logs or stumps as it occurs in the forests, no problem is presented in collecting the decay other than the problem of access to the forest. However, when the decay is to be obtained from partially decayed logs at the mill as a source, a problem is presented in making the segregation of the decay from the sound wood. Accordingly, it is necessary to segregate the logs or portions thereof containing the brown or cubical decay from logs containing sound wood. An exception is when a log is composed partially of decay and partially of sound wood, and is to be defibered by a suitable defibering process such as with the Asplund or the MacMillan defibrator, and the resulting mixed decay and sound fiber are to be used together for the production of products such as hardboards.

It should be remembered in connection with this invention that the white rot caused by *Fomes pini* and the laminated or stringy decay caused by *Polyporus weirii* are lignin destroying, but that brown cubical decays caused by *Fomes laricis, Polyporus sulphurus, Polyporus schweinitzii*, and *Fomes roseus*, and the brown cubical rot of Western red cedar caused by *Polyporus amorus*, are cellulose destroying, and it is this decay in which the cellulose element has been destroyed or reduced that is of primary concern in the instant invention. For purposes of the instant disclosure, no distinction will be made between the various types of brown or cubical decay.

The important commercial characteristics of decay which change as decay progresses are increase in friability, caustic solubility, native lignin content, and decrease in buoyancy in water. The separation of decay from sound wood is readily accomplished by physical processes based on comminution and fractionation which may be either wet or dry unit operations; or based on differences in buoyancy. The same processes may be employed to effect concentration of the decay to achieve decay products meeting the requirements of use with respect to caustic solubility and lignin content. These characteristics vary greatly for sound wood of various species, caustic solubility falling in the range of from 15% to 25%, and the lignin content, as empirically determined, in the range of from 20% to 35%. The native lignin content of sound wood is determined by the standard 72% sulfuric acid method. The best measure of the degree of decay is caustic solubility.

In selecting logs or pieces thereof for the production of the brown or cubical decay the following criteria have been found to be advantageous. The brown rots usually occur in solid rotted area, and occasionally there are isolated areas of decay which are not connected with the main rotted area. The hidden stage can usually be detected by exploring the wood beyond any discolored areas with a pick, by testing for brashness, or by treatment with an alkali staining test. Very often a rotted area may be detected by a peculiar pulling away of chunks of fiber by a coarse crosscut saw. Thus, depressions are left in the wood in the area of decay. When color is apparent in the incipient stages of the brown rot, it is usually associated with a deep reddish to reddish purple discoloration ranging to a light cream color, depending upon the species of decay and the moisture content.

In the advanced stage the brown rots can easily be identified by the shrinkage cracks and weakness of the wood. This type of decay is typified by a soft, crumbly, charcoal-like or cheesy consistency and the wood is lacking in fibrous properties. The decay material can be rubbed into a powder in the hands. If not so far decayed as to be crumbly, it can still be recognized by the fact that it does not pull slivers and gives a dead sound when struck with a pickaroon or other sharp instrument. Typically, it contains shrinkage cracks both along and across the grain when dry. Chamois-like white or cream colored mycelial felts are present in the cracks in some specimens of rot in the advanced stages. These mycelial mats do not render the decay material objectionable for use. The color in the advanced stages in Douglas fir usually appears yellowish to brown. Often there is a distinct anise odor.

While the wood in the earlier stages of the brown or cubical decays, i. e., the wood which has not yet lost its fibrous property, may have separate and distinct uses and advantages for certain purposes, and contributes even at such early stage some of the properties and advantages of decay material, it will be obvious that when a higher concentration of decay material is desired, such early stages of decay are preferably excluded on the same basis as though the wood were sound.

Several methods have been employed for separating the decayed portion of the wood from the sound wood after the initial segregation has been made of those pieces containing a major portion of decay. One method is to run the log through a comminuting machine, such as a chipper to form chips ranging in size from approximately 1½ inches to ⅛ inch and smaller particles, the sizes being expressed in terms of ability to pass through screen mesh openings. The chips are then classified according to mesh size. It has been found that the larger chips will contain primarily sound wood and the smaller chips will contain a much larger percentage of decayed wood, the division at 50 parts each sound wood and decay material occurring at chip sizes of from ¼ to ½ inch. The smaller chips containing the decay are readily ground to form a powder-like material. Another such device which has been used is a grinding machine known as a hog. Again, in general, the larger-sized particles formed are principally the sound wood and the smaller-sized particles constitute the decay material. This is illustrated in the following table wherein is shown the relation of particle sizes to proportions of decay in chips made by comminuting a Douglas fir cant.

| Screen Sizes | Percent Sound Wood | Percent Decay |
|---|---|---|
| Chips retained on 1½" mesh screen | 88.6 | 11.4 |
| Through 1½" retained on 1" | 81.0 | 19.0 |
| Through 1" retained on ½" | 66.6 | 33.4 |
| Through ½" retained on ¼" | 51.8 | 48.2 |
| Through ¼" retained on ⅛" | 34.7 | 65.3 |
| Passed ⅛" | 23.7 | 76.3 |

It has been found, in accordance with the present invention, upon chemical and physical analyses of the decay material, that the fungus hyphae decompose the wood in a chemically selective manner and that the friability of the decay residue increases generally as the stage of decay advances. It is accordingly advantageous, in using either the chipper or the hog machine method, to treat the chips or hogged material with a ball mill or similar mild comminuting action, which serves to further reduce to more finely comminuted form the decay material without substantial comminution of the sound wood. The ball milling should preferably be done with the dry material, or with the moisture content controlled so as to obtain optimum differential comminuting action of the decay material and the sound wood. The separation of decayed wood from sound wood of both Douglas fir and Western red cedar chips by use of a ball mill is readily accomplished when the moisture content of the material is not substantially more than 20%, oven dry basis. The separation may also be accomplished with green chips and wet soft decayed wood, but the pulverized decay tends to form a wet paste which coats the sound wood chips and is difficult to remove after drying. After the ball milling, the material is segregated roughly into sound wood and decay by passing it over a screen of suitable mesh size for separating the larger-sized particles of sound wood from the smaller-sized and powder-like particles of decay material. A 28 mesh screen (.0232″ opening—Tyler standard screen) has been found satisfactory in most instances, but the mesh size of the screen should be selected with reference to the particle size at which substantial differentiation occurs between the decay and the sound wood, for the particular lot of material being processed.

A preferred method is a selected combination of grinding, screening, ball milling, and rescreening steps, by which a substantial separation of the decay from the sound wood can be effected into a number of fractions of substantially uniform composition with respect to the percentage ratios of sound wood and decay. Said fractions contain lignin in fairly well defined percentage ranges corresponding to the particle size and the individual treatment in the process to which the particular fraction has been subjected. The ball milling step effects a differential pulverization of the ground material to convert the same into particle sizes corresponding to the varying friability of the chemically and physically different constituents of the material. The small sized particles represent the most friable portion, and the most advanced stage of the decay, wherein the lignin concentration is greatest.

Still other methods employed are a classification of the chips or hogged material by an air elutriation method. Another method which is used to separate sound wood chips from decay is the water saturation process. The wood chips or particles are placed in a container of water and the entire container is then placed in a chamber from which the air is partially evacuated. Then air is admitted. The more porous particles absorb water, replacing the air which was evacuated, and reach a specific gravity greater than that of water and sink to the bottom. This is the decay. The wood continues to float. It is obvious, of course, that a physical separation can be made by hand where the decay is recognizable, either by its distinctive coloration or physical properties. This method has the disadvantage that it does not lend itself to mechanization or mass production, and that it depends on visual or manual selection of the decayed portions which is not always possible with certain types of decay as pointed out hereinbefore.

Chemical analyses indicate that important commercial characteristics such as friability, caustic solubility and lignin content change as decay progresses. Applicant has discovered that decay fractions may be arranged into about three groups with respect to caustic solubilities, namely: an incipient decay fraction (caustic solubility 33%): a medium decay fraction (caustic solubility 45–55%); and an advanced decay fraction (caustic solubility 60–70%). The following table is a showing of analytical data on products of fractionation of Douglas fir cubical decay, with values from 1 to 6 representing the advance from incipient decay to advanced stages. The caustic solubility and lignin content show significant differences for the respective groups or fractions. The lignin content was ascertained by the standard sulfuric acid method.

ANALYTICAL DATA ON PRODUCTS OF FRACTIONIZATION OF DOUGLAS FIR CUBICAL DECAY

| Fractions | D. F. sound wood (Values from Chas. Doree) | 1 | 2 | 3 | 4 | 5 | 6 |
|---|---|---|---|---|---|---|---|
| Percent Caustic Solubles (Soluble in 0.8% caustic) [1] | 23.0 | 33.1 | 47.4 | 55.6 | 63.1 | 67.0 | 67.7 |
| Percent Insoluble in 72% sulfuric acid (lignin) | 32.8 | 36.2 | 44.1 | 51.7 | 60.5 | 64.0 | 70.2 |

[1] 20% usage.

Lignin is the bonding or cementing constituent of wood and other cellulosic plants. The lignin or lignin enriched fillers known to the prior art may be prepared from wood by removing the non-lignin constituents, or by adding lignin separately prepared, or both. Commercial processes for preparing lignin heretofore in use include the acid hydrolysis of wood as in the production of wood sugar solutions, the sulfonation of the lignin in wood as in the acid sulfite process of making paper pulp, the recovery of lignin from the waste liquors of the sulfite and soda processes, enrichment of semi-pulps with additional lignin precipitated from the cooking liquor, and destruction of nonlignin constituents of wood by high temperatures and pressures.

No two of the lignin preparations made in the various ways have the same physical properties or the same reactions. Some are practically insoluble, some dissolve in water, some in organic solvents. All are dark colored substances, of limited reactivity, greatly reduced from that of native lignin in the tree. They are the reaction products of the original reactive lignin. Such, for example, is the lignin resulting from acid hydrolysis, that from sulfite pulping even though water soluble by virtue of being in sulfo acid form, and that from alkaline treatment which renders the lignin particularly susceptible to oxidation and converts it into a relatively inert material.

On the other hand, the lignin content of decayed wood is a naturally occurring lignin which has had none of the treatments referred to hereinabove, and so is unaltered by the severe chemical treatments generally employed heretofore to produce lignin or lignin enriched extenders. In advanced stages of cubical decay a large proportion of the decayed wood is a highly reactive ligneous material which, when subjected to heat and pressure, is formed into a hard dense cohesive material and may be employed, either by itself or in combination with other materials, for the production of molding compounds, structural hardboards or adhesives.

The oven-dry cubical decay of Douglas fir and of Western red cedar were both found to have final specific gravities of approximately 1.18 when compressed at 10,000 pounds per sq. in. gauge and a mold temperature of 325° C. The molded products made showed excellent self-bonding or cohesion and thus indicates that the material lends itself for use, either as a structural hardboard or as a molded article. In other tests, readily molded discs of good product quality were made using the decay powder ground to pass through a 100 mesh screen. The decay powder had a moisture content of 40% on a dry powder basis. The molding was conducted at a temperature of 411° F. and 2000 pounds per sq. in. pressure for 9 minutes duration. It has been found that the energy for compression is reduced with increase in moisture content. Other factors being equal, it is more economical to use the decay material at a higher moisture content in order to conserve the energy required for compression.

In the preparation of molding compositions embodying the instant invention the decay material is reacted with a partially condensed resin such as commonly used in the preparation of molding compounds. If liquid resin is used the amount thereof to be added is calculated on the basis of its solids content. Blending or pre-mixing is accomplished in a blade or muller type of mixer before compounding on mixing rolls. Powdered resins may be used in place of liquid resins with equally good results, mixing of the ingredients being accomplished as in a dry powder ribbon mixer. Molding compositions have been made with from 10–45 percent resin content and 55–90 percent Douglas fir cubical decay. From 0–5 percent calcium carbonate and 0–1 percent zinc stearate may be added to facilitate molding. After blending or premixing the mixture is passed through the mixing rolls, the number of passes depending upon the temperature of the rolls and the physical properties of the mixture. The temperature of the rolls is, preferably, equal to the temperature at which the resin starts to flow.

In one series of experiments conducted to determine the utility of decay material when reacted with a partially condensed resin for use as a molding compound, approximately 74% of brown cubical decay from Douglas fir wood was reacted with approximately 24% of a commercial phenolic resin. Partially reacted phenol formaldehyde resins, both in liquid and in powder form, capable of thermosetting, were used. One part of zinc stearate as a lubricant and one part of calcium hydroxide as a catalyst were added to facilitate molding. The mixture of materials was rolled or compounded on conventional mixing rolls. The material thus compounded was then ground to a fine powder and standard test discs were prepared in a mold using 325° F. temperature and 3100 pounds per sq. in. pressure for 8 minutes duration. The modulus of rupture results were 9550 pounds per sq. in. and 9720 pounds per sq. in. The resulting products had good appearance, chocolate brown color and high gloss. The strength value of these products compares favorably with a modulus of rupture value of 10,200 pounds per sq. in. obtained from a standard type commercial molding powder made by compounding a mixture of approximately 55% resin and 43% wood flour with 1% each of zinc stearate and lime.

Still other molding compounds were compounded using a particular fraction of Douglas fir brown cubical decay material obtained by grinding, ball milling and screening selected wood containing a major proportion of decay. It has been found that by screening a thus prepared mixture of sound wood and decay to remove the +28 mesh size (.0232 inch opening—Tyler standard screen) material and the −65 mesh size (.0082 inch opening—Tyler standard screen) material, a −28 +65 mesh fraction is obtained which generally runs 29% to 34% of the whole. The particular decay sample used in this experiment had a lignin content of approximately 43%. The decay material was mixed with the commercial resins designated, and in the proportions indicated, in the following table. In the righthand column are listed acceptable standard values for the tests reported for commercial molding compounds:

make structural hardboards by adding the decay material to Douglas fir defibrator fiber as a binding agent. The comminuted decay is heat reactive and adhesive in character and participates actively in chemical reactions and changes occurring during the pressing operation. Douglas fir defibrator fiber was prepared by a modified Asplund process and fluffed. Samples were prepared using decay powder having an average moisture content of about 50% and oven dry. In these tests, water was added to the decay powder and mixed before mixing with the fiber. The powder was then added to the fiber with continuous stirring for from about 10 to about 15 minutes to effect a uniform dispersion of the powder on the fibers.

Decay powder was mixed with the fiber in proportions ranging from 2½ parts (18½%) of powder and 11 parts (81½%) of fiber to 10 parts (55.5%) of powder and 8 parts (44.4%) of fiber. Water was added in various quantities ranging from 1 to 10 parts, and furfural was added in 1 or 2 parts.

The mixture of fluffed fiber and decay powder was placed in a hot mold equipped with screen and vent system in the bottom. The mixture was then pressed at a temperature of the order of from 140° C. to 170° C. and at pressures of the order of 2500 pounds per sq. in. gauge for periods of from 10 to 15 minutes time. It was found that improved results were obtained if the fluffed mass was preformed before placing in the mold. This was done by preliminarily subjecting the fluffed mixture to low pressure in a mold slightly smaller in

TABLE I

| Sample No. | S-496-3 | S-496-7 | S-496-8 | S-496-10 | Acceptable Standard Values,[1] Wood Flour Fillers |
|---|---|---|---|---|---|
| Tests: | | | | | |
| Modulus of Rupture (p. s. i.) | 8,980 | 8,960 | 9,392 | 10,056 | 8,000-15,000 |
| Tensile strength (p. s. i.) | 5,610 | 7,730 | 7,992 | 6,702 | 5,000-8,000 |
| Impact—Notched Izod (ft. lb./in.) | .33 | .36 | .44 | .37 | .20-.40 |
| Specific Gravity | 1.32 | 1.34 | 1.34 | 1.35 | 1.25-1.52 |
| Water absorption—percent gain | .62 | .84 | .76 | .54 | .2-.6 |
| Cure time (min.) | 3 | 3 | 3 | 1.5 | |
| Formulation: | | | | | |
| ICC #200 solid 2 step resin, percent usage | 36 | 20 | 20 | 20 | |
| D. A. #23 liquid 1 step resin, percent usage | | 20 | 20 | 20 | |
| Decay fraction, percent | 61 | 57 | 57 | 57 | |
| Lime, percent | 1.5 | 1.5 | 1.5 | 1.5 | |
| Dye, percent | 1.5 | 1.5 | 1.5 | 1.5 | |
| | 100 | 100 | 100 | 100 | |

[1] Plastics Properties Chart—1943, published by Plastics Catalogue Corp.

The conditions of molding were 2000 pounds per sq. in. pressure and 300° F. temperature. Resin ICC #200 solid 2 step resin is a high solids content (85%) phenol formaldehyde resin manufactured by Interlake Chemical Company. D. A. #23 liquid 1 step resin is a phenolic high solids casting resin containing about 85% solids.

Thus it will be seen that the heretofore waste decay material can be used successfully in a molding compound or as a raw plastic material—by itself to produce molded articles of lower quality—and in combination with resin to produce higher quality molded articles. Not only are certain definite advantages as to quality contributed by the decay powder, such as the improvement in impact and tensile strength, but also these specific advantages and a high quality compound generally are obtained using a large percentage of low cost, hitherto waste material. The molding compound comprises a partially reacted mixture of resin forming ingredients, the further thermosetting of these ingredients as a binder involving reaction with decay to produce a decay resin of improved utility over decay alone. It will be understood that plasticizers may be admixed with decay powder and resin, as desired, and that the decay may be used with either thermosetting resins or thermoplastic resins. Likewise, that the variables of pressure, temperature, and time may be varied within the skill of the operator to produce the best quality product for the purpose desired in relation to the composition and percentages of the raw material ingredients.

Tests were conducted of the use of brown cubical Douglas fir and Western red cedar decay powders to size than the mold in which the board was finally pressed to shape.

Pressures as low as 40 pounds per sq. in. and temperatures of from 130° C. to 200° C. have been employed in the manufacture of hardboards. Pressures of about 2500 pounds per sq. in. gauge at temperatures of from 150° C. to 160° C. produced the best results. The resulting hardboard products had densities ranging from 70 to 84 pounds per cubic foot. The water absorption of the better samples in 24 hours was about 15%. The modulus of rupture for all pieces ranged from about 5,500 to about 9,600 pounds per sq. in. As a standard for comparison, the density, percentage of water absorption in 24 hours and modulus of rupture values for a .15 inch thick sample of Masonite Tempered Presdwood were 64, 12.9 and 9500, respectively.

It is interesting to observe that the addition of the decay powder, even in as small proportions as 2½ parts (18½% decay) to 11 parts (81½% fiber) of fiber, contribute materially to the reduction of water absorption. Hardboards were prepared under the same conditions but omitting the decay powder. The water absorption increased from an average of about 18 for the pieces containing the decay powder to 40% for the pieces without the decay powder.

Further boards were prepared using 66⅔% of fiber, 16⅔ of decay powder, 5% of water and 11% of furfural with 2% of Vinsol added. The better of these samples had a density of 79.8 pounds per cubic foot, water absorption in 24 hours of 13%, and a modulus of rupture value of 9640 pounds per sq. in. Vinsol has a gasoline and petroleum ether insoluble content of over 80%, usually over 90% by weight, a saponification value of between 135 and 145, and a melting point within the range of about 220° F. to about 260° F.

It will be understood that the decay material may be used either by itself or reacted with any of the well known thermoplastic or thermosetting resins for use as a binding material for the fibrous constituent of hardboard compositions; likewise, that the percentage ratios of the ingredients, the pressures, mold temperatures and press time are variables within the discretion of the operator, and will necessarily be varied within the knowledge and skill of the art to produce the best quality product for the purpose desired with the starting raw materials available. While the tests were conducted using an Asplund type Douglas fir fiber, it will be obvious that this particular type and source of the fiber is not a material part of the invention but that any of the fibers customarily used in making structural hardboards such as those from different species of both gymnesperm and angiosperm woods, cotton, flax, cornstalks, asbestos, glass fiber, and many others, may be employed.

It should be kept in mind, in connection with structural hardboard compositions, that this invention includes the novel hardboard product, and the process of making same, hereinbefore pointed out, of directly defibering a log or piece of wood containing a substantial proportion of decayed material of the type resulting from cellulose-destroying type of fungus, and then intimately mixing said defibered fiber, and pressing said fiber in a mold under heat and pressure to form said hardboard. Hardboards formed in this manner have the advantage that they employ as the raw material the fungus infected log without other or additional processing of the decay material except the defibering of the log. No separation of the decay from the sound wood is necessary. The disadvantage of such hardboard is that the composition and quality is not so uniform nor as well controlled as where the decay material is added in definite known amounts. However, for certain uses where a high degree of uniformity of quality is not necessary, the advantages may be exploited with no concern for the disadvantages.

The decay powder was also found to be useful as an ingredient in adhesives for plywood. Tests were made using a fraction of Douglas fir brown cubical decay material obtained by the grinding, ball milling and screening process hereinbefore referred to. In this case, the two finest particle size fractions representing the most friable portion of the decay and, therefore, the most advanced portion, were selected. These fractions have the highest lignin contents. The fraction identified in the first column of the following table was the decay material which passed through a 65 mesh screen (.0082" opening—Tyler standard) after the ball milling step. The fraction identified in the second column was the material remaining from this fraction after the material of less than 325 mesh size had been removed.

The tests were conducted to illustrate the use of decay fractions as extenders in adhesives for Douglas fir exterior plywood by preparing a series of panels in which each of the decay fractions described hereinabove (—65 mesh, and —65+325 mesh, material) were used. Three-ply, ⅜ inch thick Douglas fir plywood panels (⅛"–⅛"–⅛" construction) were constructed using an adhesive of the following composition:

|  | Percent |
|---|---|
| Resin (ICC–4282), 100 parts | 59.3 |
| Water, 40 parts | 23.6 |
| NaOH, 4 parts | } 5.3 |
| Na₂CO₃, 5 parts |  |
| Decay fraction, 20 parts | 11.8 |

Resin (ICC–4282) is a phenol-formaldehyde resin and described in more detail in Patent No. 2,462,253. The glue spreader was adjusted to give an average actual spread weight of about 45 pounds per 1000 square feet of double glue line. Additional tests were conducted using standard Douglas fir bark fractions in formulations as a control or benchmark, these formulations being the same as above except that the bark fractions were substituted, respectively, for the decay fractions. Pressing conditions which are standard for Douglas fir plywood were maintained, with the exception of a 30-minute assembly time for half of the panels made with Douglas fir decay formulations. The longer assembly time did not, however, appear to influence glue line quality. The results of these tests, showing a comparison between plywood made with adhesives utilizing decay fractions and plywood made with adhesives utilizing bark fractions, the latter being standard commercial adhesive formulations, are as follows:

| Extender used in otherwise standard formulation | Douglas fir decay, —65 mesh | Douglas fir decay, —65 +325 mesh | Douglas fir bark, —65 mesh | Douglas fir bark, —65 +325 mesh |
|---|---|---|---|---|
| Pressing duration (min.) | 2½ | 3 | 2½ | 3 |
| Average dry shear (p. si. i.) | 235 | 259 | 203 | 210 |
| Average dry shear wood failure (percent) | 98 | 98 | 94 | 92 |
| Average wet shear (p. s. i.) | 179 | 266 | 151 | 164 |
| Average wet shear wood failure (percent) | 92 | 93 | 100 | 95 |

It will be seen that the average shear strength, both wet and dry, and the percent of wood failure values for adhesive formulations containing the decay fractions are comparable to acceptable values from a standard plywood adhesive formulation. It is therefore established that decay material may be used in the preparation of adhesives to serve as an actual active ingredient, and provides a reacted adhesive of equal or superior quality to adhesives using extenders heretofore known in the art.

It is to be understood that the invention is not to be limited to the particular decays described herein or to decay materials formed from Douglas fir or Western red cedar, but that these particular species and their specific decays are described as examplary only of the ravages of decay on all types of forest trees, both the gymnosperms and the angiosperms, the purpose of this invention being to teach the novel and useful materials and products which can be obtained from decay material formed by the action of cellulose destroying fungi on sound wood. It is likewise to be understood that improvements in molding compounds, structural hardboards, adhesive compositions and related products employing a binding agent as an ingredient thereof, as may be obtained from particular compositions of ingredients, or selection of particular fractions of decay material, or from the modifications of the processes as herein disclosed are to be considered as included within this invention, so long as the teaching that decay material caused by cellulose destroying fungi may be employed as a novel and useful ingredient in said products is practiced.

What is claimed is:

1. An adhesive composition comprising an admixture of a phenol-formaldehyde resin, a basic reacting compound of an alkali metal, water and brown rotted wood resulting from the action of a cellulose destroying fungus on standing timber.

2. An adhesive composition comprising 100 parts of a phenol-formaldehyde resin, 4 parts of sodium hydroxide, 5 parts of sodium carbonate, 40 parts of water and 20 parts of brown rotted wood resulting from the action of a cellulose destroying fungus on standing timber.

3. A molding composition comprising the reaction product of a phenol-formaldehyde resin in an amount of from about 10% to about 45% of the composition and brown rotted wood resulting from the action of a cellulose destroying fungus on standing timber in an amount of from about 55% to about 90% of the composition.

References Cited in the file of this patent

UNITED STATES PATENTS

| Number | Name | Date |
|---|---|---|
| 1,681,151 | Mellanoff | Aug. 14, 1928 |
| 1,724,393 | Carpenter | Aug. 13, 1929 |
| 2,068,926 | Nevin | Jan. 26, 1937 |
| 2,092,622 | Koch et al. | Sept. 7, 1937 |
| 2,197,724 | Hovey | Apr. 16, 1940 |
| 2,264,421 | Ward | Dec. 2, 1941 |
| 2,325,570 | Katzen | July 27, 1943 |
| 2,382,568 | Karim | Aug. 14, 1945 |
| 2,444,929 | Hatch | July 13, 1948 |

(Other references on following page)

UNITED STATES PATENTS

| Number | Name | Date |
|---|---|---|
| 2,446,551 | Pauley | Aug. 10, 1948 |
| 2,485,587 | Goss | Oct. 25, 1949 |
| 2,578,695 | Goss | Dec. 18, 1951 |

FOREIGN PATENTS

| Number | Country | Date |
|---|---|---|
| 154,574 | Great Britain | Oct. 27, 1920 |

OTHER REFERENCES

Thaysen et al.: "The Microbiology of Cellulose, Hemicellulose, Pecin, and Gums" (1927), page 285.

Wise: Wood Chemistry, pages 833, 839, 841–842, Reinhold Pub. Corp., New York (1946).